Patented Jan. 30, 1934

1,945,314

UNITED STATES PATENT OFFICE 1,945,314

PROCESS FOR THE MANUFACTURE OF UREA

Max Hofsäsz, Amsterdam, Netherlands, assignor to Naamlooze Vennootschap De Bataafsche Petroleum Maatschappij, The Hague, Netherlands No Drawing. Application November 2, 1929, Serial No. 404,522, and in the Netherlands November 13, 1928

7 Claims. (Cl. 260—125)

The invention concerns a process for the manufacture of urea by synthesis from ammonia-carbon-dioxide compounds.

As is known, urea can be manufactured from carbon dioxide and ammonia, whereby in the first place is formed ammonium carbamate, which through the loss of one molecule of water can be converted into urea.

$$CO_2 + 2NH_3 = CO(ONH_4)NH_2 = CO(NH_2)_2 + H_2O.$$

The first stage of the reaction can be carried out under ordinary pressure.

The conversion of the carbamate of ammonium into urea must, however, take place under high pressure, whilst in this stage the presence of too much water acts adversely upon the formation of the urea.

The technical execution of this synthetic process involves great drawbacks, especially if it is desired to work continuously. The heating of the compressed gases requires a great deal of heat which is lost for the greater part when the reaction product is run off. This is particularly disadvantageous because this reaction product has to be heated again under low pressure in order to remove non-converted carbamate in the form of $CO_2$ and $NH_3$.

It is also possible first to make the carbamate separately and to transport this to the actual reaction vessel in the form of solid briquettes. There is an objection, however, against introducing solid substances in a high pressure chamber; in any case it requires a complicated apparatus. A further disadvantage of this method is the fact that the carbamate has first to be compressed into briquettes or some such form, and that the continuous production of the solid carbamate gives rise to difficulties; because after mixing and heating the gases are cooled down in order to precipitate the carbamate from the reaction mixture, and this must then be removed from the cooling chamber by means of scrapping irons or suchlike tools.

With the process according to the present invention these drawbacks are eliminated. In principle the invention consists in heating the ammonia-carbondioxide compound mixed to form a paste with an inert viscous liquid, under such conditions of pressure and temperature that the compound is converted into urea.

Preferably the gases mentioned are conducted into the inert liquid to form the carbamate of ammonium, but it is, of course, also possible first to manufacture this substance separately and thereafter to mix it with the viscous liquid.

Particularly good results are obtained by proceeding as follows:

Carbon dioxide and ammonia are conducted in a certain proportion, for example, 1 molecule of carbon dioxide to 2 molecules of ammonia, into viscous oil half-filling an autoclave provided with a stirrer. This is continued until a paste is formed containing about 50% oil. The heat thus set free is advantageously carried off through a cooler attached to the autoclave. By means of the pressure of the gases the paste is brought into a pump which, for instance by hydraulic means, pumps the mass into the high pressure chamber. In this chamber a temperature of 150–200° C. is maintained, while the pressure is about 100 atmospheres. This pressure and temperature are those ordinarily employed in the carrying out of the synthesis of urea by the known method. Here the conversion to urea takes place. From the reaction chamber the mass consisting of about 40% urea, a corresponding quantity of water, non-converted ammonium carbamate and viscous oil, is transferred to a low pressure distilling apparatus provided with a reflux cooler.

In this apparatus the ammonium carbamate is distilled off in the form of $CO_2$ and $NH_3$, whereby the heat contained in the liquid medium can be used to advantage for distilling off. The distillation gases are returned to the autoclave for the manufacture of the paste. In the aforesaid distilling apparatus a mass is left consisting of two distinctly separate layers, one a viscous oil and the other a watery solution of urea, which is run off from time to time. The separated oil flows back to the autoclave.

According to the invention mixtures of fertilizers can also be made by adding the respective additional substances at different stages in the course of the process, for instance during the preparation of the paste. In this manner highly homogeneous mixtures are obtained.

The application of special catalysts is possible with the process according to the invention, but it is not necessary.

It is evident that the process according to the invention can also be applied for the manufacture of urea from other ammonia-carbondioxide compounds, for instance from ammonium carbonate that is converted into urea through the loss of two molecules of water.

I claim as my invention:

1. Process for the manufacture of urea characterized by heating an ammonia carbon dioxide compound mixed with an inert viscous liquid under such conditions of pressure and temperature that the compound is converted into urea.

2. Process for the manufacture of urea characterized by conducting carbon dioxide and ammonia into an inert viscous oil, and heating the resulting oily ammonium carbamate paste under such conditions of pressure and temperature that the ammonium carbamate is converted into urea.

3. Process for the manufacture of urea characterized by conducting carbon dioxide and ammonia into an inert viscous oil in proportions to form an ammonium carbamate paste containing about 50% of oil, and heating the paste under such conditions of pressure and temperature that the ammonium carbamate is converted into urea.

4. Process for the manufacture of urea characterized by heating to 150°–200° C. under high pressure a pasty mass consisting of an ammonia carbon dioxide compound mixed with a viscous inert liquid.

5. Process for the manufacture of urea characterized by conducting carbon dioxide and ammonia continuously into a viscous inert liquid to form a paste of ammonium carbamate containing about 50% of oil, supplying the paste continuously into a vessel in which a pressure of 100 atmospheres and a temperature of 150 to 200° C. are maintained, distilling in a separate vessel the reaction mixture and associated liquid to drive off non-converted carbamate in the form of carbon dioxide and ammonia gases, tapping off urea solution from the residue, and returning to the paste forming stage the carbon dioxide and ammonia gases and oil recovered from the distillation.

6. In the process according to claim 5, the step which consists in utilizing the heat remaining in the viscous inert liquid after the conversion to urea, for the distillation.

7. Process for the manufacture of urea characterized by heating to 150°–200° C. under pressure of about 100 atmospheres a pasty mass consisting of an ammonia carbon dioxide compound mixed with a viscous inert liquid.

MAX HOFSÄSZ.